United States Patent
Suryanarayana et al.

(10) Patent No.: US 10,936,301 B2
(45) Date of Patent: Mar. 2, 2021

(54) SYSTEM AND METHOD FOR MODULAR PATCH BASED FIRMWARE UPDATE

(71) Applicant: DELL PRODUCTS, LP, Round Rock, TX (US)

(72) Inventors: Shekar Babu Suryanarayana, Bangalore (IN); Anand P. Joshi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/382,681

(22) Filed: Apr. 12, 2019

(65) Prior Publication Data
US 2020/0326930 A1     Oct. 15, 2020

(51) Int. Cl.
| | |
|---|---|
| G06F 8/658 | (2018.01) |
| G06F 16/18 | (2019.01) |
| G06F 8/654 | (2018.01) |
| G06F 8/65 | (2018.01) |
| G06F 9/4401 | (2018.01) |

(52) U.S. Cl.
CPC ............... *G06F 8/658* (2018.02); *G06F 8/65* (2013.01); *G06F 8/654* (2018.02); *G06F 16/1847* (2019.01); *G06F 9/4406* (2013.01)

(58) Field of Classification Search
None
See application file for complete search history.

(56) References Cited

U.S. PATENT DOCUMENTS

| | | | | |
|---|---|---|---|---|
| 7,155,560 B2* | 12/2006 | McGrew | ............... | H04W 8/245 |
| | | | | 711/103 |
| 7,623,378 B1 | 11/2009 | Wahlstrom et al. | | |
| 8,707,297 B2 | 4/2014 | Brown et al. | | |
| 2003/0066062 A1* | 4/2003 | Brannock | ............... | G06F 8/658 |
| | | | | 717/169 |
| 2012/0159468 A1 | 6/2012 | Joshi et al. | | |
| 2014/0189674 A1* | 7/2014 | Nagao | ..................... | G06F 8/658 |
| | | | | 717/170 |
| 2016/0239685 A1 | 8/2016 | Li et al. | | |
| 2017/0194052 A1 | 7/2017 | Schmier et al. | | |
| 2018/0307479 A1* | 10/2018 | Subramanian | .......... | G06F 8/654 |

* cited by examiner

*Primary Examiner* — Wynuel S Aquino
*Assistant Examiner* — Mark A Gooray
(74) *Attorney, Agent, or Firm* — Larson Newman, LLP

(57) ABSTRACT

A method for updating firmware includes determining a difference between versions of a firmware image at a flash memory device, and determining a revision to a firmware file of the first version of the firmware image based on the difference. The method generates a firmware update package that includes a payload containing the revision, and updates the firmware file using the firmware update package.

20 Claims, 7 Drawing Sheets

SYSTEM AND METHOD FOR MODULAR PATCH BASED FIRMWARE UPDATE

FIELD OF THE DISCLOSURE

The present disclosure generally relates to information handling systems, and more particularly relates to a modular patch-based update mechanism.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for updating firmware includes determining a difference between versions of a firmware image at a flash memory device, and determining a revision to a firmware file of the first version of the firmware image based on the difference. The method may generate a firmware update package that includes a payload containing the revision, and update the firmware file using the firmware update package.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the figures is provided to assist in understanding the teachings disclosed herein. The description is focused on specific implementations and embodiments of the teachings and is provided to assist in describing the teachings. This focus should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

Figure 1:
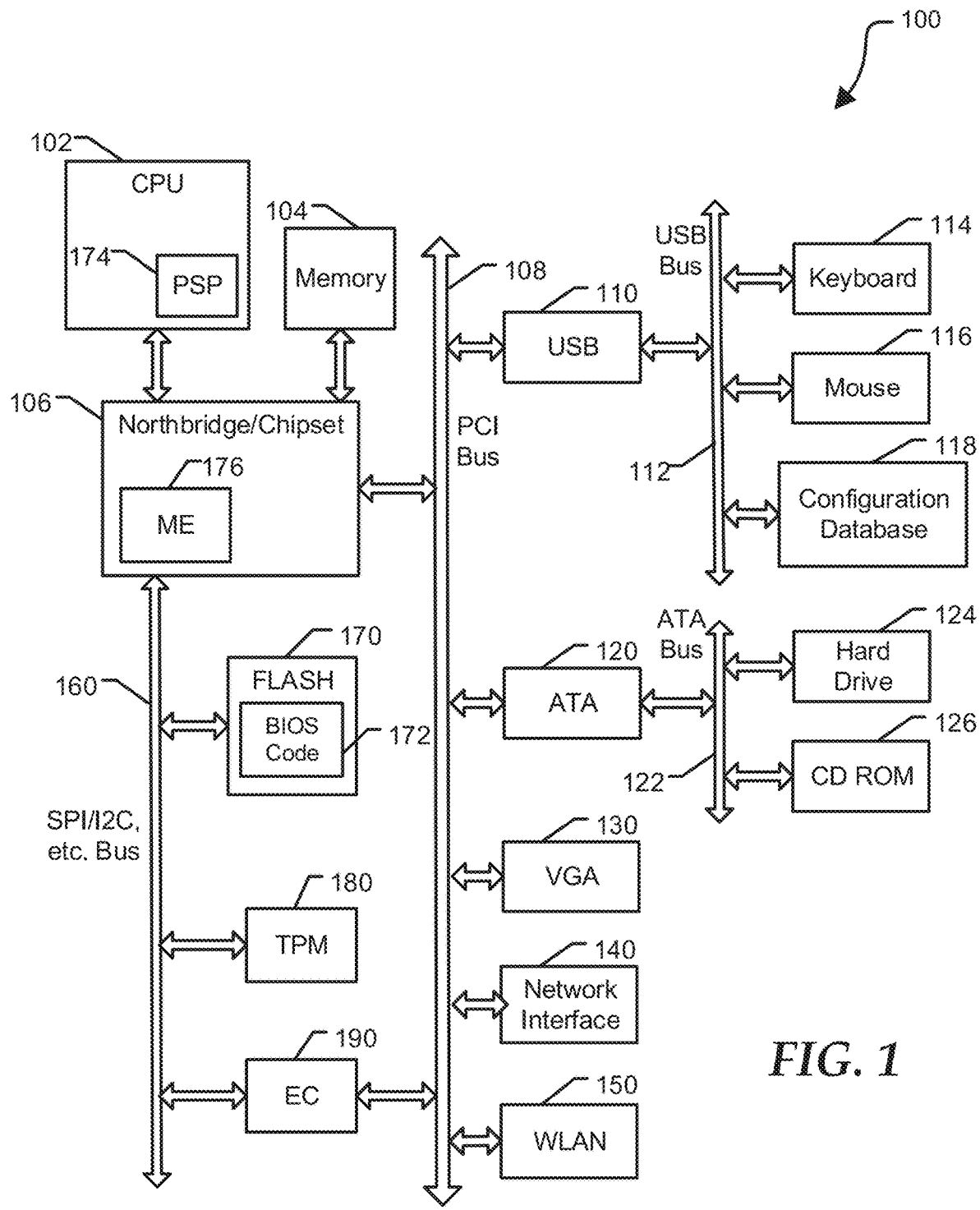
FIG. 1 is a block diagram of an information handling system according to an embodiment of the present disclosure.

FIG. 1 illustrates an information handling information handling system 100 including a processor 102, a memory 104, a chipset 106, a peripheral component interconnect (PCI) bus 108, a universal serial bus (USB) controller 110, a USB 112, a keyboard device controller 114, a mouse device controller 116, a configuration database 118, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a flash memory device 170 for storing basic input/output system (BIOS) code 172, a trusted platform module (TPM) 180, and a embedded controller (EC) 190. EC 190 can be referred to as a service processor, and an embedded controller, and the like. Flash memory device 170 can be referred to as an SPI flash device, BIOS non-volatile random-access memory (NVRAM), and the like. EC 190 is configured to provide out-of-band access to devices at information handling system 100. As used herein, out-of-band access herein refers to operations performed without the support of CPU 102, such as prior to execution of BIOS code 172 by processor 102 to initialize operation of information handling system 100. In an embodiment, information handling system 100 can further include a platform security processor (PSP) 174 and/or a management engine (ME) 176. In particular, an x86 processor provided by AMD can include PSP 174, while ME 176 is typically associated with systems based on Intel x86 processors.

PSP 174 and ME 176 are processors that can operate independently of core processors at CPU 102, and that can execute firmware prior to the execution of the BIOS by a primary CPU core processor. PSP 174, included in recent AMD-based systems, is a microcontroller that includes dedicated read-only memory (ROM) and static random access memory (SRAM). PSP 174 is an isolated processor that runs independently from the main CPU processor cores. PSP 174 has access to firmware stored at flash memory device 170. During the earliest stages of initialization of information handling system 100, PSP 174 is configured to authenticate the first block of BIOS code stored at flash memory device 170 before releasing the x86 processor from reset. Accordingly, PSP 174 provides a hardware root of trust for information handling system 100. ME 176 provides similar functionality in Intel-based systems. In another embodiment, EC 190 can provide aspects of a hardware root of trust. The root of trust relates to software processes and/or hardware devices that ensure that firmware and other software necessary for the operation of an information handling system is operating as expected.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. For example, portions of chipset 106 can be integrated within CPU 102. In an embodiment, chipset 106 can include a platform controller hub (PCH). Information handling system 100 can include additional buses and bus protocols, for example, inter-integrated circuit (I2C) and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS code 172 can be referred to as a firmware component, and the term BIOS is herein used interchangeably with the term firmware component, or simply firmware. In an embodiment, BIOS code 172 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

BIOS code 172 includes instructions executable by CPU 102 to initialize and test the hardware components of information handling system 100 and to load a boot loader or an operating system (OS) from a mass storage device. BIOS code 172 additionally provides an abstraction layer for the hardware, i.e. a consistent way for application programs and operating systems to interact with the keyboard, display, and other input/output devices. When power is first applied to information handling system 100, the system begins a sequence of initialization procedures. During the initialization sequence, also referred to as a boot sequence, components of information handling system 100 are configured and enabled for operation, and device drivers can be installed. Device drivers provide an interface through which other components of the information handling system 100 can communicate with a corresponding device.

During the lifetime of the information handling system, it may become necessary or advisable to update the firmware such as the BIOS with a new version having one or more firmware revisions. This procedure is often referred to as flashing the BIOS. During this process, the previous BIOS can be deleted, and the revised BIOS can be stored at the flash memory device. The storage capacity of the flash memory device is typically limited to 32 MB or 64 MB of data. The space constraint restricts the size of the firmware revisions. In addition, currently, there is no method to update just a portion of the firmware. For example, if a minor change is needed in the BIOS to fix a security issue or a corrupted area of the BIOS firmware, the entire BIOS firmware has to be updated. In addition, original equipment manufacturers (OEMs) of information handling systems may desire to provide advanced firmware capabilities, there is no method to just add the advanced firmware capabilities. Further, typically updating the BIOS firmware requires an update to the entire SPI flash memory device which may also impose multiple reboots resulting in a longer downtime.

Techniques disclosed herein overcome these issues by allowing, identifying, and updating a portion of the BIOS firmware. A modular flash file structure (MFFS) allows for an update package to contain revisions for a specific firmware file or a portion thereof. In addition, additional headers and attributes included in the MFFS dynamically identifies size and location of a revision. For example, a BIOS update package may an executable that includes only the revisions to the BIOS security firmware file to fix the security issue or the corrupted area of the BIOS firmware instead of the typical update package that includes the entire BIOS firmware image. In another example, the BIOS update package may only include the advanced firmware capabilities of the newer BIOS firmware. By targeting only the portions of the BIOS firmware for the update or additional capabilities, the downtime is minimized. For example, reboots are minimized if not eliminated.

Figure 2:
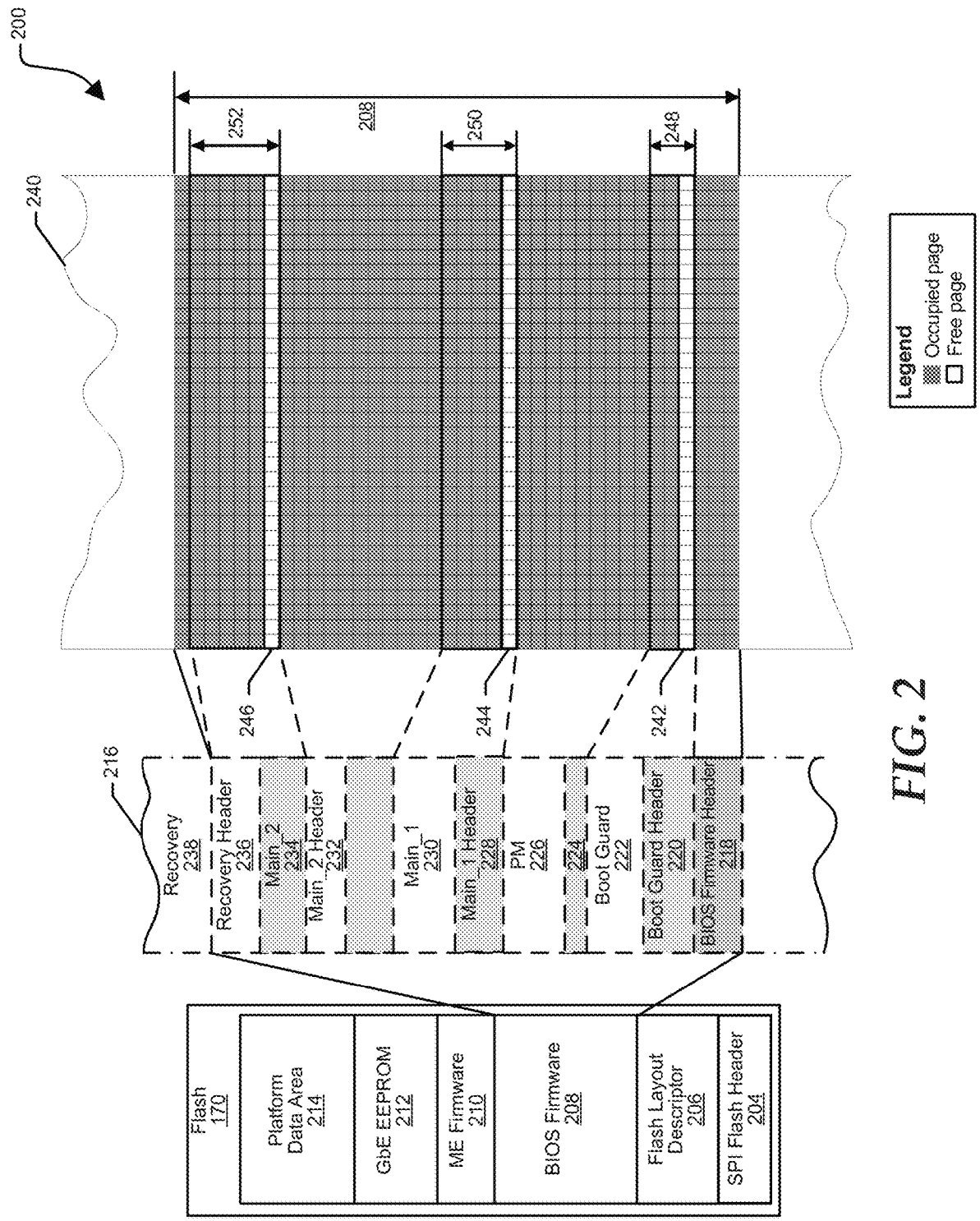
FIG. 2 is a block diagram illustrating a layout of a flash memory device according to a specific embodiment of the present disclosure.

FIG. 2 shows a layout 200 of flash memory device 170. Layout 200 includes a BIOS firmware structure 216 and a flash memory array 240. Flash memory device 170 may include an SPI flash header 204, a platform data area 214, a flash layout descriptor 206, and one or more firmware regions. Each firmware region may include a firmware component such as a BIOS firmware 208, a management engine (ME) firmware 210, and a Gigabit Ethernet electrically erasable programmable read-only memory (GbE EEPROM) 212. A firmware component generally includes a collection of firmware routines, device drivers, and other software programs. A particular firmware component is typically assigned a revision or version number identifying the collection of firmware routines or firmware files included in the particular firmware component.

BIOS firmware structure 216 shows the file structure of BIOS firmware 208. BIOS firmware 208 may include one or more firmware volumes. A firmware volume is a basic storage data and/or code repository. Each firmware volume may have a firmware volume header which may include attributes or data fields such as a UEFI globally unique identifier (GUID), size, format, read-write permissions of the firmware volume, etc. BIOS firmware structure 216 includes a BIOS firmware header 218 and several firmware volumes and its associated firmware volume headers. The firmware volumes include a boot guard 222, a PM 226, a main_1 230, a main_2 234, and a recovery 238. The firmware volume headers include a boot guard header 220, a PM header 224, a main_1 header 228, a main_2 header 232, and a recovery header 236. Flash memory array 240 shows a plurality of flash pages for BIOS firmware 208 which includes flash pages 248, flash pages 250, flash pages 252. Flash pages 248 includes free pages 242. Flash pages 250 includes free pages 244. Flash pages 252 includes free pages 246. The flash pages that are shaded grey are occupied by code while flash pages that are not shaded are unoccupied or free.

SPI flash header 204 includes information regarding flash memory device 170. For example, SPI flash header 204 may include attributes or data fields regarding flash memory device 170, such as a GUID, number of regions, size of each region, size of the flash memory device 170, size of free space, number of free pages, and type of flash memory device 170. Flash layout descriptor 206 may describe the layout of flash memory device 170 such as how many sections or regions flash memory device 170 may be divided into. Flash layout descriptor 206 may also include the number of firmware components in flash memory device 170, the size and density of each of the firmware components, name of the firmware component in a firmware region, permissions associated with each firmware component or firmware region, etc.

Platform data area 214 may include data to be used by the firmware components during execution. BIOS firmware 208 may include platform configuration data in addition to BIOS code 172. ME firmware 210 may include code and configuration data for ME functions such as clock control, Intel® active management technology (AMT), etc. GbE EEPROM 212 includes code and configuration data for integrated Gigabit Ethernet (GbE) such as a media access control (MAC) address.

BIOS firmware structure 216 may use an MFFS to describe the organization of BIOS firmware 208. The MFFS may be used to retrieve, create, update, and delete revisions to the firmware components such as BIOS firmware 208. The MFFS may include information such as how many firmware volumes and files are included in the firmware component. The MFFS may also include information regarding size, location, free space, pages, and blocks occupied or associated with each of the firmware component, the firmware volume, and/or the firmware file. The firmware component, the firmware volume, and the firmware file may include a header which describes structure and features of the firmware component, the firmware volume, and the firmware file. For example, the firmware volume header may include the following features: length of the firmware volume, file system in which the firmware volume is formatted, capabilities and power-on defaults for the firmware volume, a 16-bit checksum of the firmware volume header, etc. The description may also include the following: size of the firmware volume, size of the firmware volume header, number of free pages, size of each page or block, offsets, addresses, etc. Similar information may be included in the firmware component header the firmware file header.

As used herein, a patch is a piece of code that is used to fix a flaw or provide an improvement to a firmware code such as new features or capabilities. Generally, an update package may include one or more firmware images which include one or more patches. Each patch may include at least one flash page of code. The term flash page is herein used interchangeably with the term page. As shown herein, each square in flash memory array 240 represents a page which is the smallest unit of virtual flash memory that can be programmed or written to, typically of a fixed length 8-16 kB in size as may be determined by a processor architecture. The size of the flash pages may be discovered during the boot process, which allows the use of memory more efficiently by aligned allocations to the size of the flash pages. As shown herein, flash memory array 240 is 4096 bytes (4 k bytes) aligned.

Figure 3:
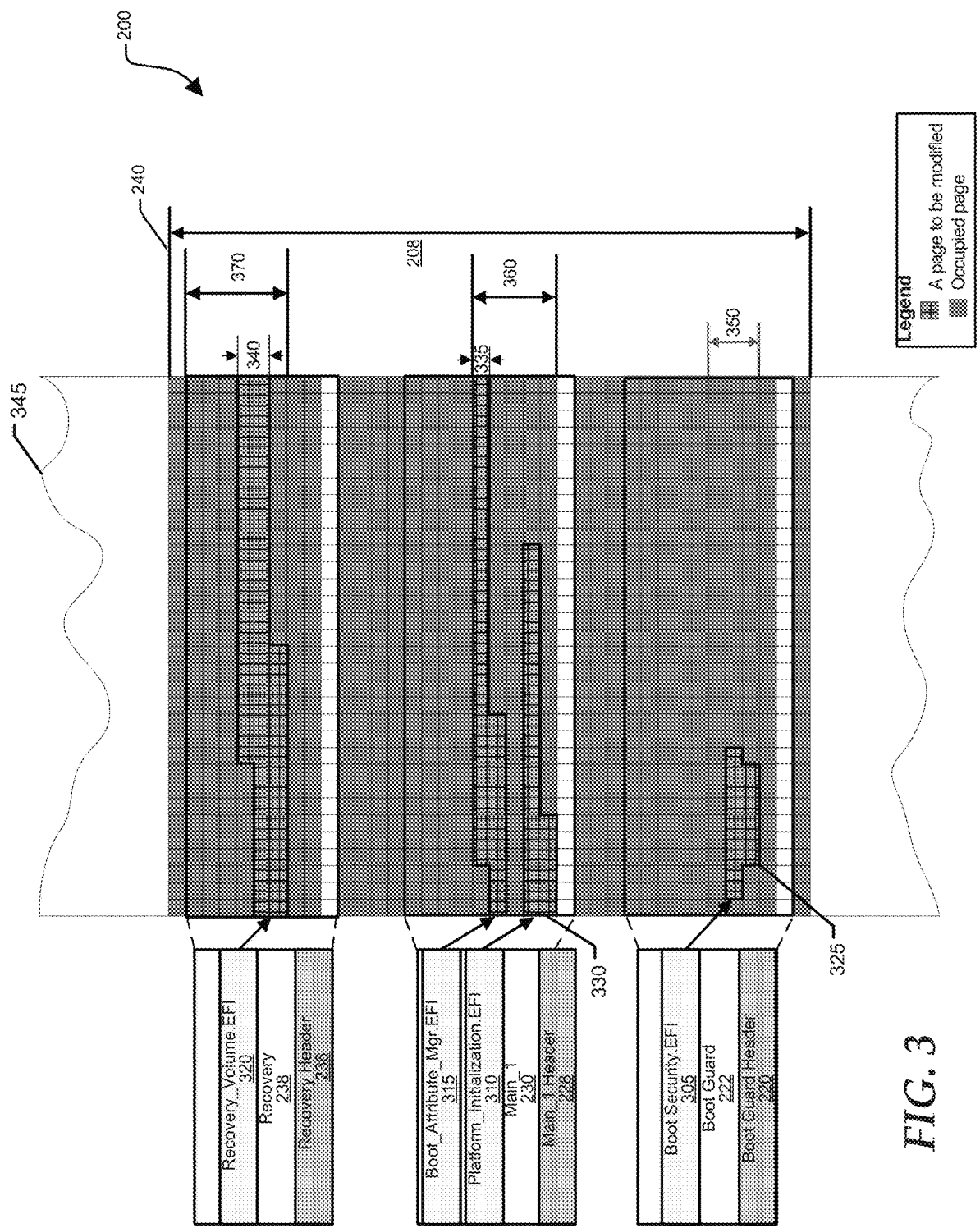
FIG. 3 is a block diagram illustrating a flash memory mapping according to a specific embodiment of the present disclosure.

FIG. 3 shows a mapping 300 of a flash memory array 345. Similar to flash memory array 240, flash memory array 345 shows a plurality of flash pages of BIOS firmware 208. In particular, flash memory array 345 shows a plurality of occupied flash pages mapped to boot guard header 220, boot guard 222, main_1 header 228, main_1 230, recovery header 236, and recovery 238. Boot guard 222 includes an EFI file boot_security.efi 305. Main_1 230 includes EFI files boot_attribute_mgr.efi 315, platform_initialization.efi 310. Recovery 238 includes an EFI file recovery_volume.efi 320.

Boot_security.efi 305, boot_attribute_mgr.efi 315, platform_initialization.efi 310, and recovery_volume.efi 320 are existing EFI files in flash memory device 170 which are to be patched or updated. Flash memory array 345 shows the flash pages that map to each of the aforementioned EFI files. For example, flash pages 340 maps to recovery_volume.efi 320, flash pages 335 maps to boot_attribute_mgr.efi 315, flash pages 330 maps to platform_initialization.efi 310, and flash pages 325 maps to boot_security.efi 305. Finally, also shown are flash pages that may be updated or patched during the flash, such as a patch 370, a patch 360, and a patch 350. Patch 350 includes updates to boot guard 222 which includes flash pages 325. Patch 360 includes updates to main_1 230 which includes flash pages 330 and flash pages 335. Patch 370 includes updates to recovery 238 which includes flash pages 340.

Figure 4:
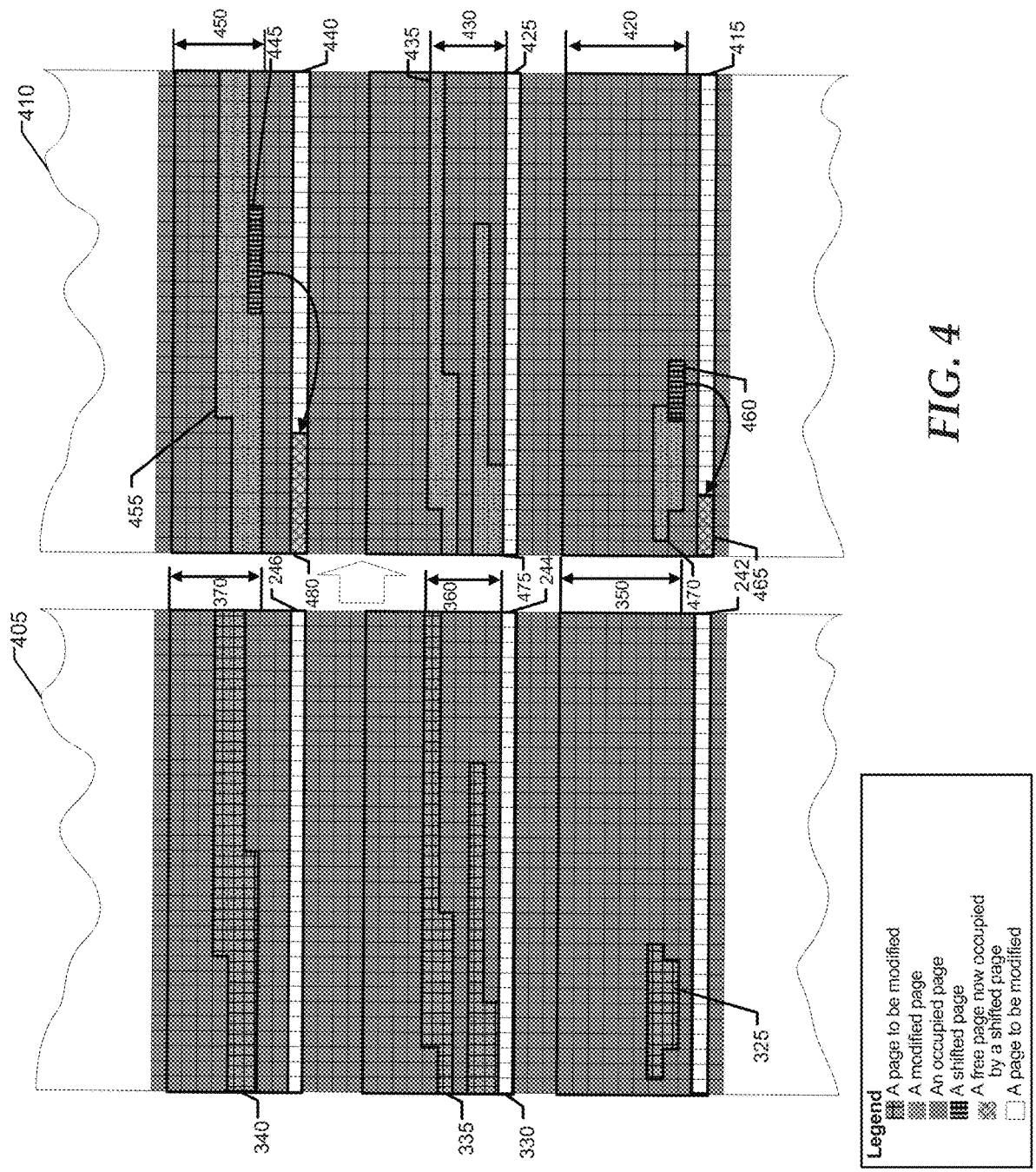
FIG. 4 is a block diagram illustrating a flash memory mapping before and after an update according to a specific embodiment of the present disclosure.

FIG. 4 shows a mapping 400 of a flash memory array of BIOS firmware 208 before and after an update. Mapping 400 includes a flash memory array 405 and a flash memory array 410. Flash memory array 405 shows flash pages of BIOS firmware 208 before the update. Flash memory array 410 shows flash pages of BIOS firmware 208 after the update. Flash memory array 405 includes free pages 242, 244, and 246. Flash memory array 405 also includes flash pages to be modified by patches 350, 360, and 370.

Flash memory array 410 includes flash pages 420, 430, and 450. Flash pages 420 includes flash pages after patch 350 has been applied. Flash pages 430 includes flash pages after patch 360 has been applied. Flash pages 450 includes flash pages after patch 370 has been applied. Flash pages 460 and 470 combined may show flash pages after flash pages 325 has been updated. Flash pages 460 may represent additional flash pages which may have caused the rest of the flash pages to be shifted accordingly and occupy a portion of free pages 242. Flash pages 465 shows the flash pages that occupied some of free pages 415. Free pages 415 represent the remaining free pages of free pages 242 after the update. Flash pages 430 includes flash pages 435 and 475. Flash pages 435 represent flash pages after flash pages 335 has been updated. Flash pages 475 represent flash pages after flash pages 330 has been updated.

Flash pages 450 includes flash pages 445 and 455. Flash pages 445 and 455 combined shows the flash pages after flash pages 340 has been updated. Flash pages 445 may represent additional flash pages which may have caused some of the flash pages to be shifted accordingly and occupy some of free pages 246. Flash pages 480 shows the flash pages that occupied a portion of free pages 246. The occupied free pages in the free pages 246 may be equivalent to the number of flash pages 445. Flash pages 440 represent the remaining free pages after the update.

Figure 5:
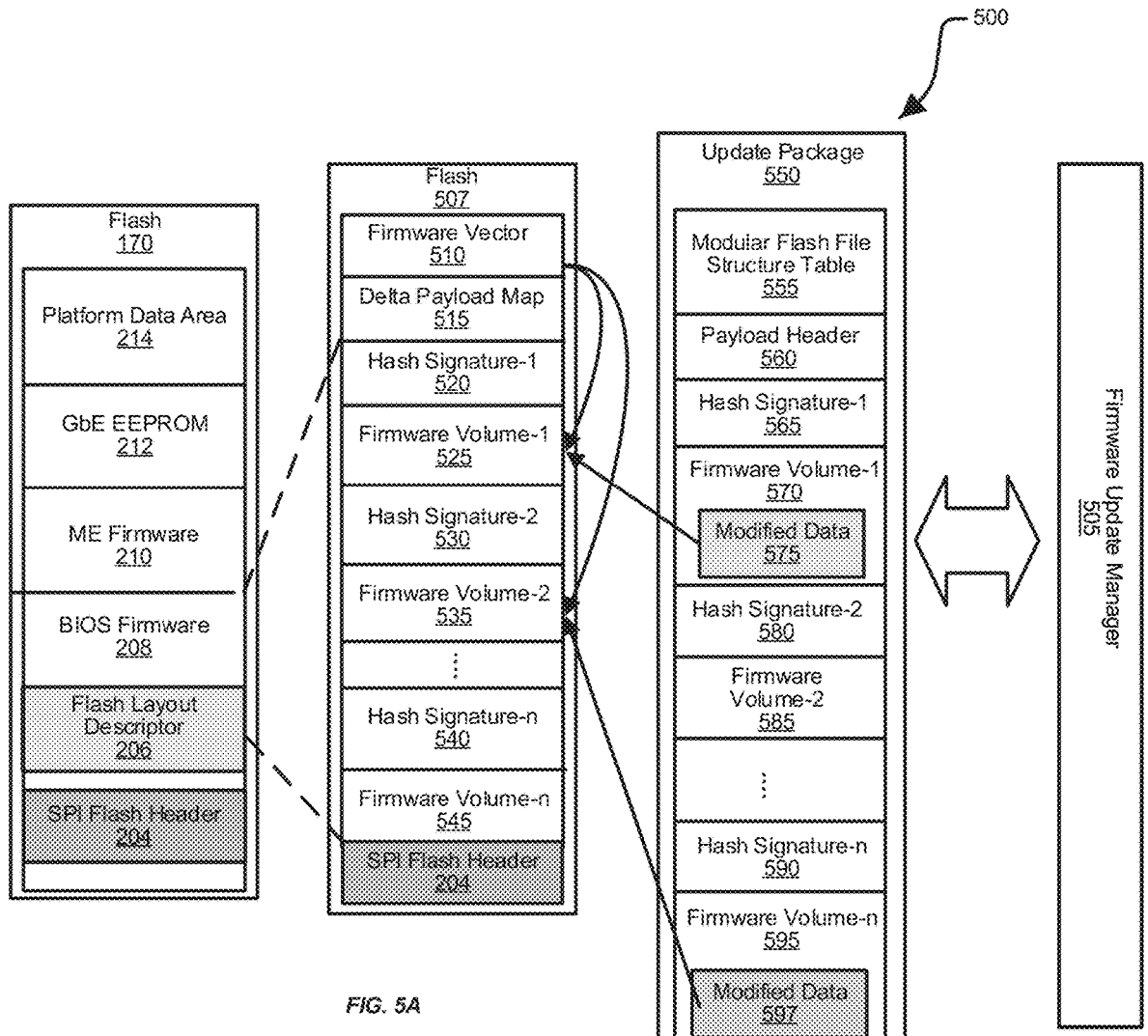
FIG. 5A is a block diagram illustrating a layout of a flash memory device and an update package according to a specific embodiment of the present disclosure.
FIG. 5B is a block diagram illustrating a firmware vector table of flash memory device according to a specific embodiment of the present disclosure.

FIG. 5A shows a layout 500 for a modular patch-based firmware update mechanism. Layout 500 includes flash memory device 170 of FIG. 1, a flash memory device 507, an update package 550, and a firmware update manager 505. Update package 550 includes an MFFS table (MFFST) 555, a payload header 560, hash signature-1 565, hash signature-2 580, hash signature-n 590, firmware volume-1 570, firmware volume-2 585, and firmware volume-n 595. Firmware volume-1 570 includes modified data 575. Firmware volume-n 595 includes modified data 597. Modified data, as used herein may include code and/or data updates to firmware components. Flash memory device 507 shows flash memory device 170 in greater detail. Flash memory device 507 includes SPI flash header 204, a firmware vector table (FVT) 510, a delta payload map 515, a hash signature-1 520, a hash signature-2 530, a hash signature-n 540, a firmware volume-1 525, a firmware volume-2 535, and a firmware volume-n 545.

Firmware update manager 505 identifies the structure of update package 550 using MFFST 555 which includes the following: a size, a major version number, a minor version number, information regarding firmware images for the update. As used herein, firmware image is an updated version of a firmware component in flash memory device 170. For example, MFFST 555 may include the following: a page size, a page count, pages occupied, a block size, a firmware image size, location, and a hash signature. MFFST 555 may also include a number, a location, and a size each of the firmware volumes in each firmware image. The location may include an offset and an address of each of the firmware volumes, the modified data, and the firmware update files. MFFST 555 may include information regarding the modified data or the firmware update files such as number of modified data and/or firmware update files, size and location of the modified data and/or each of the firmware update file, number of pages of the modified data and/or each firmware update file, etc.

As used herein, firmware update files are the updated versions of the firmware files in the flash memory device. For example, a firmware update file may include a code and/or data to update or modify a corresponding existing firmware file. Each of the firmware update files may have a respective firmware update file header. The firmware update file header may include a major and minor version number, a GUID, and a hash signature. The firmware image or a portion thereof such as the firmware update file, the code or data may be encrypted.

Firmware update manager 505 may use FVT 510 to identify the hash signature, the size, and the location of each the firmware component, the firmware volume, and the firmware file. The location may include an address and/or an offset of the firmware volume or firmware file. Firmware update manager 505 may also use FVT 510 to determine the structure of flash memory device 507 and identify pointers associated with each hash signature, the firmware component, the firmware volume, and the firmware file.

Firmware update manager 505 compares the size and offsets of each modified data or firmware update file in update package 550 to its corresponding firmware file. Firmware update manager 505 may determine deltas between firmware files and firmware update files generate delta payload map 515 based on the deltas. Delta payload map 515 may include a relocation index, a size, an address and/or an offset of the firmware component, the firmware volume, the firmware file, a page, a block, code and/or data. Firmware update manager 505 may determine the name, version, address, size and/or offset of the firmware component and/or firmware file to be updated. Firmware update manager 505 may flash the identified firmware component and/or firmware file with the modified data using delta payload map 515, FVT 510, MFFST 555, and/or hash signature. As shown in diagram 500, FVT 510 identifies that the firmware files to be updated are at firmware volume-1 525 and firmware volume-2 535. Firmware update manager 505 may identify which modified data to use in updating the identified firmware files. Here, modified data 575 is used to update a firmware file in firmware volume-1 525 and modified data 597 is used to update a firmware file in firmware volume-2 535.

The size, address, and/or offset of the firmware components, firmware volumes, and firmware files may change after the update. For example, the updated firmware component and/or firmware file may be larger or smaller than the corresponding firmware component and/or firmware file after the update. The delta payload map may also include a relocation index such as a pointer to the address and/or the offset of the firmware file or a portion thereof after the update. The delta payload map may also include the size or number of pages or blocks that may have been shifted because of the update.

FIG. 5B shows a table 502 for a modular patch-based firmware update mechanism. Table 502 is an FVT table that shows the association of a firmware image with its firmware volumes and firmware files, such as the EFI files. Other embodiments of the FVT table, for example, variations of table 502, are possible and are intended to fall within the scope of the invention. Table 502 includes an FVT header 509, firmware volumes 512a-n and hash signature index-0 through hash signature index-n. Each firmware volume is associated with a hash signature index. In addition, each firmware volume includes one or more firmware files. For example firmware volume-1 512-a includes firmware file-1 517a through firmware file-n 517c. Firmware volume-2 512b includes firmware file-1 519n through firmware file-n 519c. Firmware volume-n 512c includes firmware file-1 522a through firmware file-n 522c. MFFST 555 may have similar structure and contents as table 502 except that information in MFFST 555 is based on a runtime payload contained in the update package, wherein the runtime payload is used to update the firmware components in the flash memory device.

Figure 6:
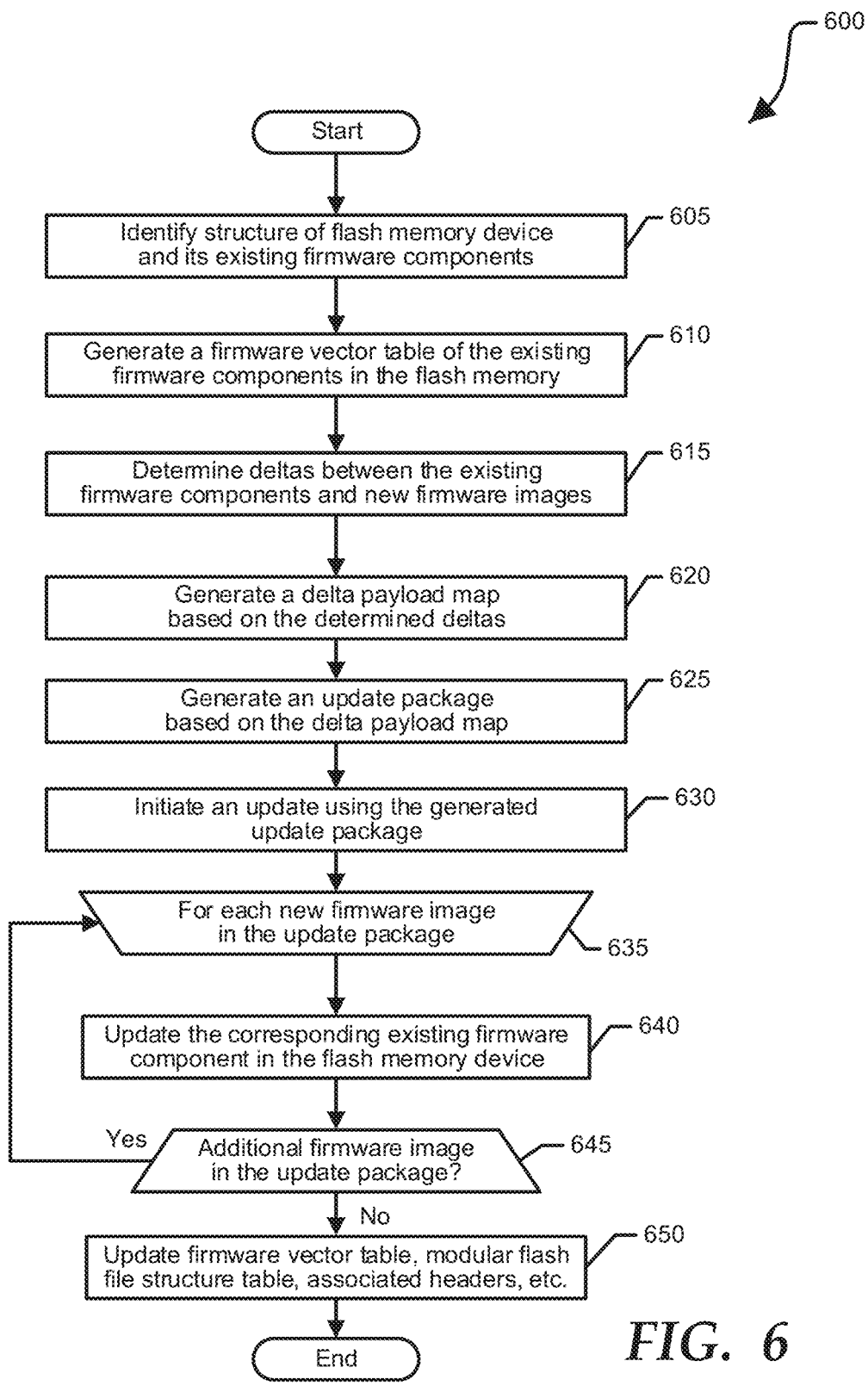
FIG. 6 is a flow diagram of a method for updating firmware according to a specific embodiment of the present disclosure.

FIG. 6 shows a method 600 for modular patch-based firmware update mechanism. The method 600 may be performed by a firmware update program manager. At block 605, the structure of the flash memory device and firmware components along with its versions using the implemented MFFS may be determined. The firmware update manager may use a flash layout descriptor, an SPI flash header, hash signatures, firmware volume headers, etc. in the identification. The hash signatures are used to determine the major and minor version of each of the firmware components and/or firmware files. The SPI flash header describes the layout of the firmware regions in the flash memory. The layout includes how many firmware volumes are in each firmware region, the size and offset of each of the firmware volumes, the size, and offsets of free spaces in each of the firmware volume and the firmware region. Each firmware volume has a corresponding firmware volume header which describes its layout. The layout of the firmware volume includes how many firmware files are in the firmware volume, the names and versions of the firmware files, the size of each firmware file, offsets of each firmware file, and information regarding free pages in each of the firmware volumes such as the number, size, and offset of the free pages.

At block 610, an FVT may be generated based on the identified structure of the flash memory device including the firmware components, firmware volumes, and firmware files. The FVT may include the size, number of pages, page size, number of blocks, block size, address, and/or offset of each firmware file, firmware volume, and/or firmware component. There may be one FVT associated with the flash memory, with each firmware component, and with each firmware file.

At block 615, the deltas between the existing firmware component and an updated firmware image may be determined. Using the hash signatures, the firmware update manager may determine the version, such as the major and minor version of the existing firmware files and/or firmware components and the updated firmware image. Because the hash signature in the flash memory is associated with an FVT and the new firmware image is associated with an MIFFST, the firmware update manager can compare the contents of the existing firmware components in the flash memory device with the contents of the updated firmware images.

At block 620, a delta payload map may be generated based on the determined deltas between the existing firmware component and the updated firmware image. The delta payload map may include the new size and new offsets in the flash memory device after the update. In addition, the delta payload map may include offset relocation indexes in case of increased or decreased size of the firmware component, firmware volume, and/or firmware file after the update. The offset relocation indexes may identify the offsets of the page, the firmware file, the block, before and after the shift.

At block 625, the update package is generated based on the delta payload map. The update package may be a combination of generated firmware images. Each firmware image may include the deltas or the updates to at least one of the firmware files in the firmware component. A hash signature and FVT may be generated for each firmware image. Similar to the flash memory, the update package may be implemented using MIFFS. A firmware update volume may include one or more firmware update files and may be associated with a hash signature.

The update package includes a payload which includes improvements, corrections to address errata, and other revisions to the firmware components or a portion thereof such as a firmware file. The update package may include the MIFFST, a payload header, one or more firmware volumes, one or more firmware update files, and/or a portion of a firmware file such as binaries and/or data for the updates. The update package may not include the binaries or data that is not going to be used in the updates. Because the update package may not include the entire updated firmware image, the update package may be smaller than the typical update package which includes the entire updated firmware image. For example, a firmware component, which is 16 MB in size, may be updated to 17 MB in size. Typically, the update package would include the 17 MB firmware image. Because, the update package in the current disclosure may only include modified code and/or data for the portion of the firmware component to be updated, such as to fix a corrupted file, the update package may only be 1 MB in size instead of 17 MB which results in a faster update with minimal downtime.

Generating the update package includes generating the MFFST of the update package. The MFFST may include information regarding the update package such as its structure and its major and minor versions. The structure of the update package may include information such as a number of firmware images and its corresponding hash signatures and firmware image headers or payload headers. The structure may further include information regarding the firmware images, such as a number of firmware volumes and its corresponding firmware volume header. Finally, the structure may include information regarding the firmware volumes, such as the number of firmware update files and its corresponding firmware update file header.

A firmware image header may include a plurality of attributes associated with the firmware image, such as a GUID, a version number, size and location of the firmware image, etc. A firmware volume header may include a plurality of fields regarding the firmware volume, such as a GUID, a version number, size and location of the firmware volume. A firmware update file header may include a plurality of fields regarding a firmware update file, such as a GUID, a version number, size, and location of the firmware update file. The size may include a number of pages, number of blocks, number of bytes, etc. The location may include an address and/or an offset of the firmware image, the firmware volume, or the firmware update file.

At block 630, updates the existing firmware components may be initiated using the update package. The update package includes a payload containing at least one new firmware image. The firmware update manager can host the update package and facilitate dissemination of the update package to one or more information handling systems. Alternatively, a user of the information handling system may download the update package from an original equipment provider or the like. The firmware update can be initiated when the package is executed. For example, during a reboot/initialization procedure at the information handling system, the flash memory device can be updated. Once the update is initiated, the method identifies the firmware components to be updated.

At block 635, the method traverses each firmware image in the update package. The firmware update manager may use a list, the MFFST, or the like in the traversal. Each firmware image that is being processed may be referred to as the current firmware image. Each firmware image may be used to update the corresponding existing firmware component in the flash memory device.

At block 640, the firmware update manager updates the corresponding existing firmware component in the flash memory device based on the delta payload map and the contents of the firmware image. If the content if the firmware image is an update to an existing firmware file, then the firmware update manager identifies and updates the existing firmware file. The firmware update manager uses the size, the offsets, and the relocation indexes in the delta payload map to update the existing firmware file. If the content of the firmware image is an additional firmware file, that is there is no corresponding firmware file in the flash memory device, then the firmware update manager adds the content to the firmware component based on the offsets, the addresses, and/or the relocation indexes in the delta payload map.

If there is an additional firmware image in the update package, then the next firmware image may be processed at block 645. If there is no additional firmware image to be processed, then the method proceeds to block 650.

At block 650, the associated data structures and/or tables such as the FVT, the MFFST, the SPI flash header, the flash layout descriptor, firmware component headers, the firmware volume headers, firmware file headers, etc. are updated. For example, the one or more of the aforementioned structures may be updated with the current address, size, offset, etc. of the firmware component. After the updates, the process ends.

Figure 7:
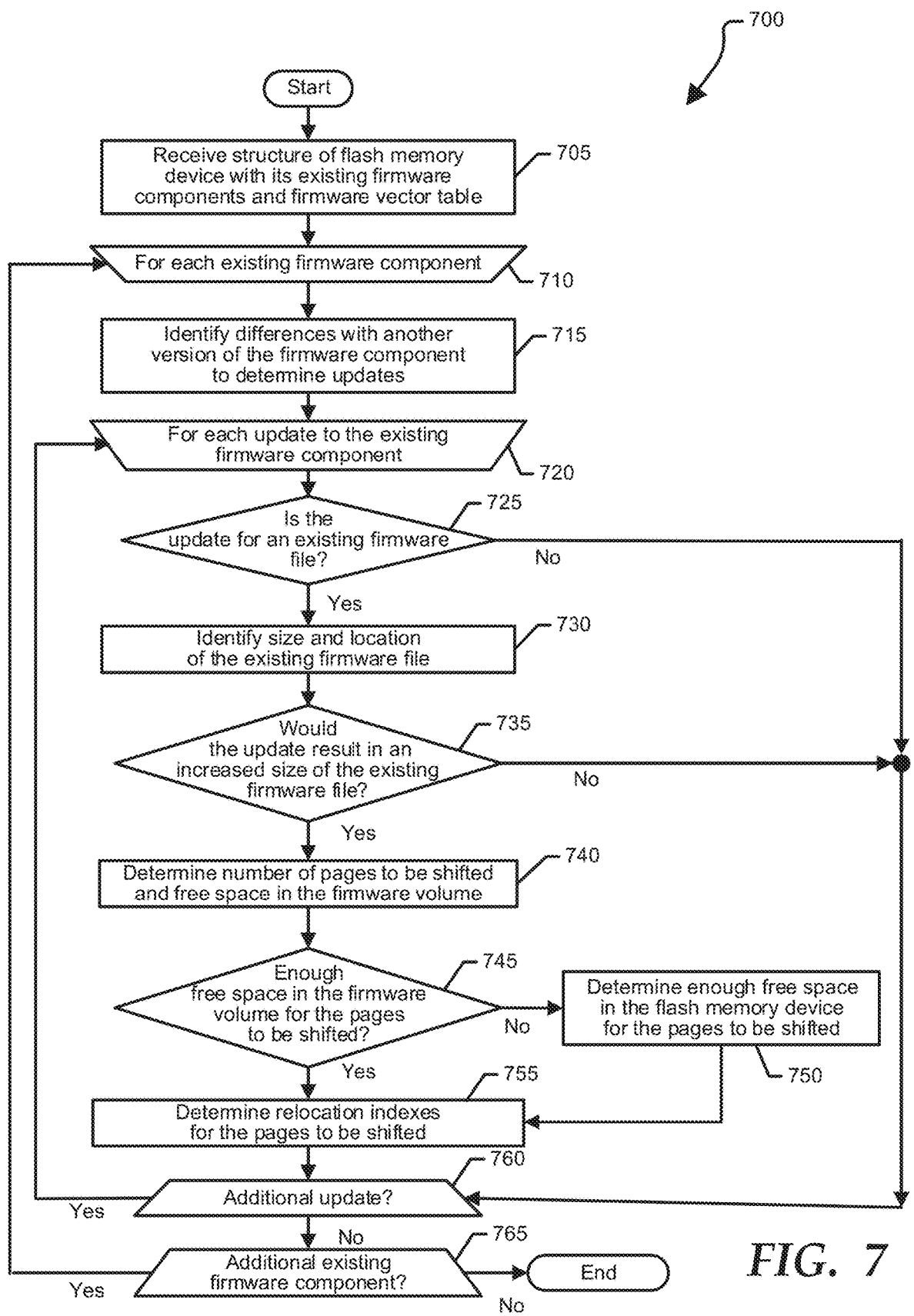
FIG. 7 is a flow diagram of a method for determining differences between an old firmware version and a new firmware version according to a specific embodiment of the present disclosure.

FIG. 7 a method 700 for determining deltas between the existing firmware components and the firmware images. The method 700 may be performed by a firmware update program manager. At block 705, a process may receive the structure of the flash memory device which may include information regarding the existing firmware components, the firmware volumes, and the firmware files such as the FVT and the hash signatures. Each existing firm component is traversed at block 710. The process may use a list, the FVT, or the like in the traversal. Each firmware component and firmware image that is being processed may be referred to as a current firmware component and a current firmware image respectively.

At block 715, the differences between the contents of the existing firmware components and the contents of the firmware image are identified. The firmware image is a different version of the existing firmware component, that is the firmware image may be a newer or older version. The determination may be based on the version of the firmware component and the firmware image. The version may be identified based on the hash signature associated with the firmware component and the firmware image. A particular version of the firmware component may include specific firmware files which may be different than the firmware files of the firmware component with a different version. In another example, a particular version of the firmware component may include the same firmware files but with different versions. The firmware files may include revisions of the existing firmware files. The contents of the firmware image may be compared to the contents of its corresponding firmware files in the flash memory device. The firmware update manager may compare the size, offset, and/or address of each content of the firmware image to the contents of the corresponding firmware file. The comparison may use the MFFST and/or the FVT. The differences or deltas identified during the comparison may be used to generate the update. The update may include a change or revision to the existing firmware component or the existing firmware file. For example, the update may include the code and/or data revision. In another example, the update may include the additional page and/or modified page of the firmware file. In yet another example, the update may include the revised firmware file. The update may also include the firmware file that is not in the existing firmware component. The updates may be combined to generate the update package. The update package may be implemented using a MIFFS. At block 720, the process traverses each update to the existing firmware component. The firmware update manager may use a list of updates or the like in the traversal.

At block 725, the process determines if the update is for an existing firmware file. If the update is for an existing firmware file, then process proceeds to block 730. At block 730, the size and location of the existing firmware file are identified. At 735, the process determines whether the update would result in an increased size of the existing firmware file. The size, the offset, and/or address of the existing firmware file may be compared to the update via the FVT. If the update would result in an increased size of the existing firmware file, then the process proceeds to block 740. Otherwise, the process proceeds to block 760. At block 740, the number of pages to be shifted to accommodate the increased size of the firmware file is determined. In addition, the size and location of the free space and/or free pages in the firmware volume are determined. After the determination, the process proceeds to block 745. At block 745, it is determined whether there is enough free space in the firmware volume for the pages to be shifted. If there is enough free space, the process proceeds to block 755. Otherwise, the process proceeds to block 750. At block 750, it is determined whether there is enough free space in the flash memory device for the update. A free space or free pages in a different firmware volume of the current firmware component may be a priority over a free space or free pages in a different region of the flash memory device. The method then proceeds to block 755.

At block 755, the relocation index for the pages to be shifted may be determined. The relocation index may include the previous location and the new location of the free pages. The process then proceeds to block 760. At block 760, if there are additional updates to be processed, then the method proceeds to block 720. Otherwise, the method proceeds to block 765. At block 765, if there is an additional existing firmware component to be processed, then the method proceeds to block 720. Otherwise, the method ends.

The above examples refer to the BIOS firmware component. However, those skilled in the art will readily appreciate that other firmware components may be updated as disclosed in the current application. In addition, the firmware update manager may be external or internal to the information handling system. Referring back to FIG. 1, the information handling system 100 can include a set of instructions that can be executed to cause the information handling system to perform any one or more of the methods or computer-based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at information handling system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or another network.

In an alternative embodiment, dedicated hardware implementations such as application specific integrated circuits, programmable logic arrays, and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for updating firmware, the method comprising:
   determining structure of a flash memory device including a layout of a firmware volume of a first version of a firmware image at the flash memory device, wherein the first version of the firmware image is implemented using a modular flash file structure;
   generating a hash signature to identify the first version of the firmware image and a second version of the firmware image;
   generating a firmware vector table that shows the layout of the firmware volume of the first version of the firmware image;
   determining a difference between the first version of the firmware image at the flash memory device, and the second version of the firmware image based on the hash signature and the firmware vector table;
   determining a revision to a firmware file of the first version of the firmware image based on the difference of the first version of the firmware image and the second version of the firmware image;
   generating a delta upload map based on the difference of the first version of the firmware image and the second version of the firmware image, wherein the delta upload map includes an offset relocation index;
   generating a firmware update package that includes a payload containing the revision based on the delta upload map, wherein the modular flash file structure identifies a size and a location of the revision; and updating the firmware file using the firmware update package based on the offset relocation index.

2. The method of claim 1, wherein the modular flash file structure includes a firmware volume header that includes attributes regarding the layout of the firmware volume of the firmware image.

3. The method of claim 2, wherein the attributes include number of firmware volumes, number of offsets, size of free space and number of free pages of the firmware volume.

4. The method of claim 1, further comprising:
generating a modular flash file structure table based on a layout of the firmware update package.

5. The method of claim 1, further comprising:
determining whether the updating the firmware file using the firmware update package result in an increased size of the firmware image.

6. The method of claim 1, wherein the delta upload map includes a new offset and size of the firmware image after the updating of the firmware file.

7. The method of claim 6, wherein the relocation index includes a page to be shifted in response to an increased size of the firmware image after the updating of the firmware file.

8. The method of claim 7, further comprising:
shifting an occupied page to a free page of a firmware volume during the updating,
wherein the shifting of the page is based on the relocation index in the delta upload map.

9. An information handling system comprising:
a flash memory device including a firmware image having a modular flash file structure, wherein the modular flash file structure includes a firmware volume header and a firmware volume attribute; and
a processor configured to:
determine structure of the flash memory device including a layout of a firmware volume of a first version of the firmware image at the flash memory device, wherein the first version of the firmware image is implemented using the modular flash file structure;
generate a hash signature to identify the first version of the firmware image and a second version of the firmware image;
generate a firmware vector table that shows the layout of the firmware volume of the first version of the firmware image;
determine a difference between the first version of the firmware image at the flash memory device, and the second version of the firmware image based on the hash signature and the firmware vector table;
determine a revision to a firmware file of the first version of the firmware image based on the difference of the first version of the firmware image and the second version of the firmware image;
generate a delta upload map based on the difference of the first version of the firmware image and the second version of the firmware image, wherein the delta upload map includes an offset relocation index;
generate a firmware update package that includes a payload containing the revision based on the delta upload map, wherein the modular flash file structure identifies a size and a location of the revision; and
update the firmware file using the firmware update package based on the offset relocation index.

10. The information handling system of claim 9, wherein the processor is further configured to generate a delta payload map that includes a new offset and size of the firmware image after the update of the portion of the firmware image.

11. The information handling system of claim 10, wherein the processor is further configured to shift an occupied page in a firmware volume to a free page in the firmware volume in response to a firmware file increasing in size after the update of the portion of the firmware image.

12. The information handling system of claim 11, wherein the shift of the occupied page is based on a relocation index in the delta payload map.

13. A non-transitory computer-readable medium including code that when executed causes a processor to perform a method, the method comprising:
determining structure of a flash memory device including a layout of a firmware volume of a first version of a firmware image at the flash memory device, wherein the first version of the firmware image is implemented using a modular flash file structure;
generating a hash signature to identify the first version of the firmware image and a second version of the firmware image;
generating a firmware vector table that shows the layout of the firmware volume of the first version of the firmware image;
determining a difference between the first version of the firmware image at the flash memory device and the second version of the firmware image based on the hash signature and the firmware vector table;
determining a revision to a firmware file of the first version of the firmware image based on the difference of the first version of the firmware image and the second version of the firmware image;
generating a delta upload map based on the difference of the first version of the firmware image and the second version of the firmware image, wherein the delta upload map includes an offset relocation index;
generating a firmware update package that includes a payload containing the revision based on the delta upload map, wherein the modular flash file structure identifies a size and a location of the revision; and
updating the firmware file using the firmware update package based on the offset relocation index.

14. The computer-readable medium of claim 13, wherein the modular flash file structure includes a firmware image header, wherein the firmware header includes a second plurality of attributes describing a second layout of a firmware image.

15. The computer-readable medium of claim 14, wherein the second plurality of attributes include number of firmware volumes in the firmware image, size of each firmware volume, an offset of each firmware volume, size of free space in the firmware image.

16. The computer-readable medium of claim 13, wherein the update package is configured using the modular flash file structure.

17. The computer-readable medium of claim 13, further comprising generating a firmware vector table that identifies an offset of the first portion of the firmware file.

18. The computer-readable medium of claim 17, wherein the identifying the first portion of the firmware file is based on the offset in the firmware vector table.

19. The computer-readable medium of claim 13, further comprising determining whether size of the firmware file will change based on the updating of the first portion of the firmware file.

20. The method of claim 19, further comprising in response to the determining that the size of the firmware file will change, shifting a page affected by the change to occupy a page of the free pages in the firmware volume.

* * * * *